United States Patent [19]

Stolfa

[11] Patent Number: 4,682,416
[45] Date of Patent: Jul. 28, 1987

[54] METAL CUTTER

[76] Inventor: Kazimir Stolfa, 46 Wimbledon Avenue, Narrabeen, N.S.W. 2101, Australia

[21] Appl. No.: 723,951

[22] PCT Filed: Jul. 25, 1984

[86] PCT No.: PCT/AU84/00143
§ 371 Date: Mar. 22, 1985
§ 102(e) Date: Mar. 22, 1985

[87] PCT Pub. No.: WO85/00541
PCT Pub. Date: Feb. 14, 1985

[30] Foreign Application Priority Data

Jul. 26, 1983 [AU] Australia .............................. PG0482

[51] Int. Cl.$^4$ .............................................. B26B 15/00
[52] U.S. Cl. ......................................... 30/228; 30/247
[58] Field of Search ................ 30/228, 241, 349, 290, 30/247, 250; 74/55

[56] References Cited

U.S. PATENT DOCUMENTS

| 2,047,483 | 7/1936 | McArdle et al. | 30/228 |
| 2,256,779 | 9/1941 | McHenry | 30/228 X |
| 2,604,695 | 7/1952 | McGary et al. | 30/250 X |
| 2,635,335 | 4/1953 | James | 30/228 X |
| 3,654,700 | 4/1972 | Pawloski | 30/228 X |

Primary Examiner—Donald R. Schran
Assistant Examiner—Willmon Fridie, Jr.
Attorney, Agent, or Firm—Birch, Stewart, Kolasch & Birch

[57] ABSTRACT

A detachable cutter head (6), for fitting to a portable electric drill, comprises a movable blade (10) mounted to pivot with respect to a fixed blade (9) which consists of a leg portion (30) and a forwardly and laterally extending foot portion (31) defining a first shearing face (36). The movable blade (10) comprises a bifurcated leg portion (17) extending along side the fixed blade portion (30), and a foot portion curled towards and below the first shearing face (36) to form a second shearing face (50) with a rear bevelled edge (51), cooperating with the first shearing face (36).

9 Claims, 7 Drawing Figures

METAL CUTTER

BACKGROUND OF THE INVENTION

This invention relates to a cutter for sheet metal and is more specifically concerned with a portable sheet metal cutter.

A portable sheet metal cutter may use the scissors principle or the guillotine principle. These principles of operation are described in detail in Australian patent specification No. 49614/69 entitled "AN IMPROVED TIN-SNIPS, A HAND GUILLOTINE FOR CUTTING SHEET METAL". Briefly, the scissors principle relies on two moving blades operated from opposite sides of the cut whereas the guillotine principle relies on a fixed blade and a moving blade both disposed on the ends of arms which extend away from the same side of the cut.

From a practical point of view the guillotine principle is preferable, because the metal portions severed from one another by the cut may be of some length and can easily obstruct the operator's hands, if the cutter is using the scissors principle. Also, if the cutter is to be motor driven a more compact assembly results if the blade-support arms extend away from the cut alongside one another.

A motor-driven portable sheet metal cutter has been proposed in the U.S. Pat. No. 4,173,069 using three blades. The centre blade is reciprocated back-and-forth and is sandwiched between two fixed blades. Each fixed blade has one shearing face and the movable blade has two shearing faces—co-operating with the respective fixed blade faces to provide two parallel cuts. A problem with such an arrangement is that thin sheet metal tends to flex in the vicinity of the cut and makes it hard for the operator to follow a scribed line or other marker defining the line of the cut. Also the moving blade shearing surface is disposed beneath the cut and the two cuts, one for each fixed blade, are spaced by the thickness of the moving blade and result in the sheet being severed into three pieces.

A simpler form of portable sheet metal cutter is described in U.S. Pat. No. 2,635,335. The cutter is provided at one end of a head adapted to be attached to a portable electric drill. The head carries a pair of blades pivoted to one another and one of which is movable and the other fixed. The movable blade is oscillated about the pivot axis by an extension arm which is formed at its end with a follower riding in an endless groove guide surface eccentrically arranged around the axis of symmetry of a rotatable disc. The disc is carried inside the head by a drive shaft which passes through spaced bearings inside the head and has its other end formed as a stub-shaft which can be gripped by a chuck of the drill.

The fixed blade is in the form of an L-shaped plate having one limb forming a flat leg attached to the head, and the other limb forming a foot extending laterally away from the free end of the leg on one side so as to lie in a plane perpendicular to the leg. The edge of the foot adjacent the leg is provided with a linear edge spaced from the plane of the leg and formed with a shearing face lying in a plane perpendicular to the plane containing the axis of the pivot.

The movable blade is formed as a flat plate lying against the leg of the fixed blade and terminating at its lower end in a sharp straight corner which lies in substantially the same plane as the shearing face of the fixed blade. The end-portion of the moving blade is accomodated in the gap between the fixed shearing face and the plane of the leg so that the portion of the moving blade between the pivot and its lower corner edge is in compression when a sheet of metal is being sheared, to transmit the compressive force of the cut through the metal of the flat movable blade to the pivot.

The cutter described is effective for cutting along straight lines or for following curves in one direction, but it cannot be used to follow curves in the opposite direction because of the arrangement of the parts which causes the edge of the workpiece above the foot to butt against the exposed face of the movable blade and prevent the cutter being turned in the direction opposite to that of the foot. To cut along curves in said other direction, it is necessary to detach the head from the drill and fit a different head having the relative positions of the fixed and moving blades interchanged.

SUMMARY OF THE INVENTION

A first object of the invention is to provide a detachable cutter head for fitting to a portable electric drill and which, despite having only two blades, is able to follow curves in both directions on a workpiece more easily than has hitherto been possible.

A second object of the invention is to provide a head of simple yet rigid construction capable of being fitted to a portable electric drill in a way which makes tool so formed easier and more reliable to use. In accordance with the present invention a power driven portable head for a sheet metal cutter working on the guillotine principle as set forth above, has two blades pivoted to move relative to one another and one of which is fixed to the head the outer being mounted to oscillate about the pivot axis during operation of the head, the fixed blade having a leg portion attached to the head and, at its free end, a foot extending laterally away from the leg portion, a straight edge on the foot adjacent the leg portion being formed with a first shearing face displaced laterally away from the plane of the leg portion on its side opposite to that on which the movable blade is pivotally mounted, the movable blade having one end portion adjacent the head arranged to be oscillated about the pivot axis by a portable rotational drive applied to the head, and its other end-portion shaped to pass beneath the free end of the leg portion and to terminate in a second shearing face which co-operates with the first shearing face to form the cut.

By arranging the pivot between the two blades on the opposite side of the leg portion to the foot, the moving cutter can follow a curve in both directions as the exposed face of the movable blade does not abutt against one cut edge of the workpiece as the cutter advances.

Preferably the fixed blade is formed of metal plate shaped to provide a flat leg portion perpendicular to the pivot axis and a flat foot making an included angle with the leg portion of greater than 90° and preferably about 115°. The shearing faces are, however, still shaped to lie in a plane extending substantially perpendicular to the pivot axis.

In the preferred form of the invention the faces of the foot which face the direction of advance of the cutter are bevelled away on the underside of the foot and along the cutter to be moved easily to the left or right as the cut progresses.

The head is conveniently formed as a cylindrical shroud having a pair of diametrically arranged, opposed slots extending back along the shroud from its end to which the fixed blade is connected. The leg portion of the fixed blade may be welded to the end rim of the shroud on one side of the slots so that the moving blade lies in the plane of the slots. Suitably the moving blade has its end in the shroud bifurcated to accommodate a drive disc eccentrically mounted on one end of an externally threaded drive shaft which can be screwed into the chuck holder of the drill after this configuration, which is easy to use, rugged in performance and compact and simple. It is also cheap and easy to manufacture.

BRIEF DESCRIPTION OF THE DRAWINGS

The invention will now be described in more detail, by way of examples, with reference to the accompanying drawings in which.

DETAILED DESCRIPTION OF PREFERRED EMBODIMENT

Figures 1, 2:
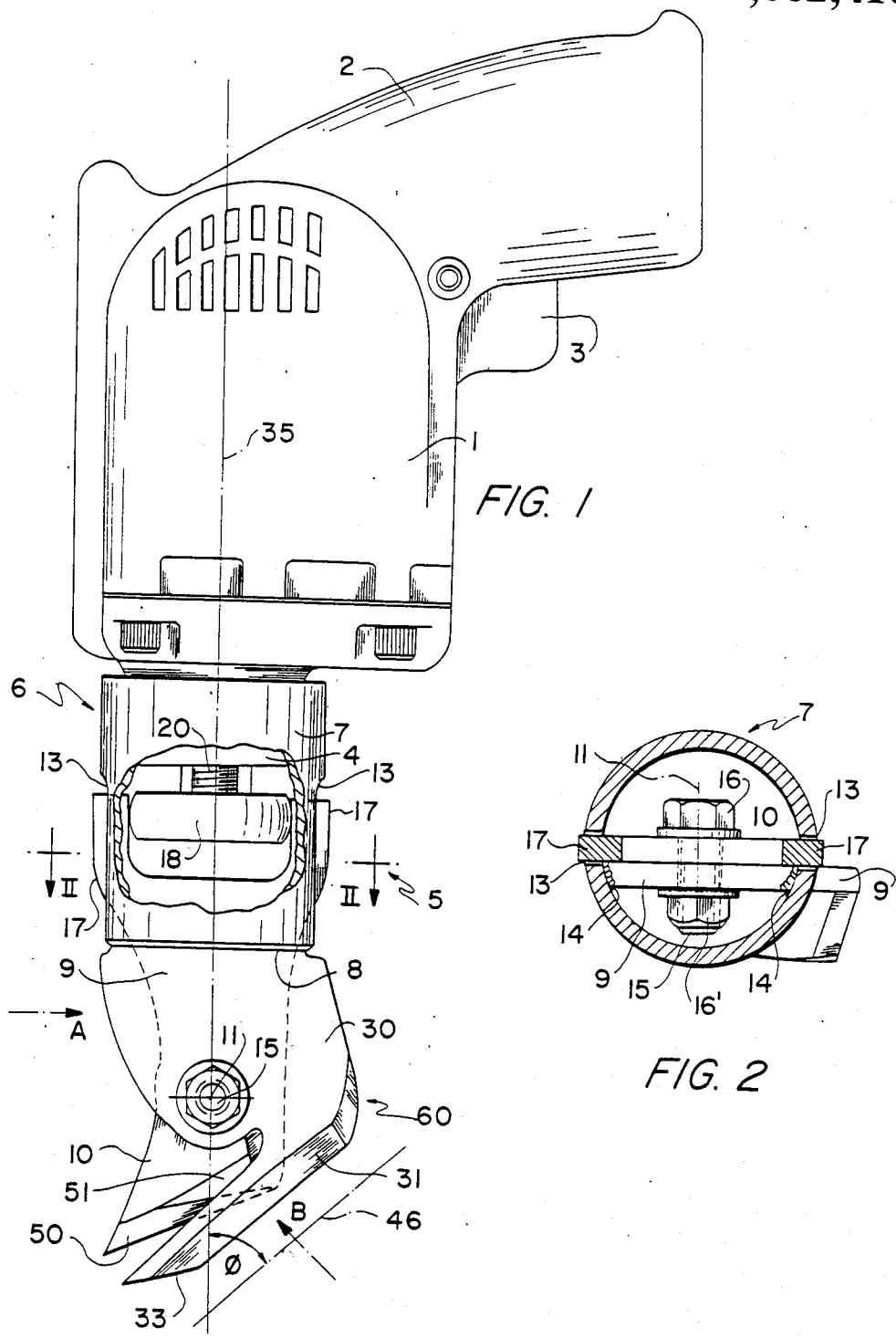
FIG. 1 is a side elevation, partially broken away, of a portable electric drill having a sheet metal cutter attached to it.
FIG. 2 is a cross-section through FIG. 1 taken on the line and the direction indicated by the arrows II—II in FIG. 1.

FIG. 1 shows a portable electric drill of conventional construction having a pistol grip 2, an operating trigger 3, and a mounting collar 4 to which different attachments to be driven by the drill can be secured. The attachment shown secured to the collar in FIG. 1 is a sheet metal cutter operating on the guillotine principle described hereinabove, and shown generally at 5.

The cutter 5 has a head 6 formed with a surrounding cylindrical shroud 7 having projecting from its lower cylindrical rim 8 a fixed plate blade 9 to which a movable plate blade 10 is pivoted so that it can oscillate about a pivotal axis 11.

The lower portion of the shroud 7 is formed with two diametrically arranged slots 13 passing through its wall and opening through its rim 7 as shown in FIGS. 1 and 2. The upper end of the fixed blade 9 is welded at 14 to the inside of the shroud 7 so that it flanks one side of the plane of the slots 13. The pivot axis 11 is provided by a bolt 15 having a bolt-head 16 and passing slidably through a bore in the movable blade 10 and screwed through an internally threaded opening in the fixed blade 9. A locknut 16' retains the bolt 15 in position and the movable blade 10 is permitted limited movement along the pivotal axis 11 of about two or three millimetres.

The upper end of the movable blade 10 is bifurcated to provide two spaced cam followers 17. These fit opposite sides of a cam disc 18 shown in FIG. 1 and mounted eccentrically on one end of a drive shaft 20 which is externally threaded and screwed into a threaded socket (not shown) provided on the drill to attach a chuck to it. The socket is arranged coaxially in the centre of the collar 4. The thickness of the steel plate from which the movable blade 10 is fabricated is such that opposite sides of its bifurcated upper end lie within the plane defined by the slots 13, and each bifurcation projects slightly from a respective slot as shown at 17 in FIG. 1. A grub-screw 22 enables the shroud to be attached to the collar 4.

The fixed blade 9 is provided with a flat leg portion 30 and a flat foot portion 31 which extends laterally away from one side of the lower or free end of the leg portion 30. The foot lies in a plane making an angle B with the plane of the leg portion, such angle being in practice about 115° as shown in FIG. 5. As is also shown in this Figure the under corners of the foot 31 facing in the direction of its travel are bevelled away as shown at 33 and 34 and a further bevel 35 is provided adjacent a straight edge 36 of the foot extending parallel to but spaced from the plane of the leg portion 30. A first shearing face perpendicular to the pivot axis and parallel to the plane of the leg portion 30, is formed along the side of the foot 30 identified by the corned edge 36. As is clearly apparent from FIG. 4 the foot 31 extends well forwardly from the leg portion 30, the longitudinal axis of the shroud 7, referenced 35 in FIG. 1, making a backward sloping angle of about 45° to the direction of advance of the cutter, as shown by the angle φ in FIG. 1.

Figure 3:
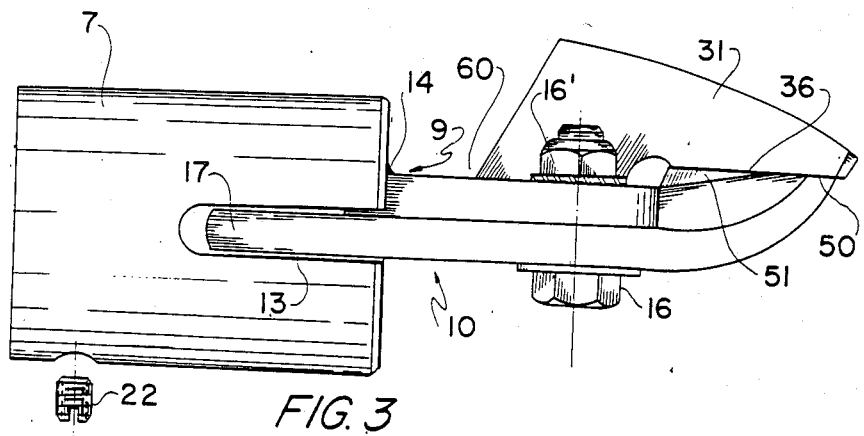
FIG. 3 shows the cutter head as seen when viewed in the direction of the arrow A in FIG. 1.
Figure 4:
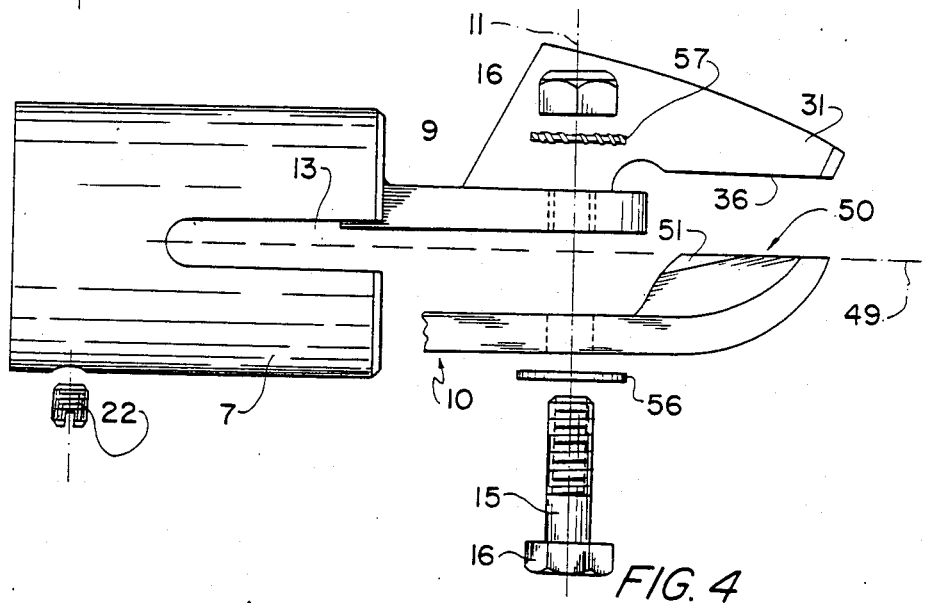
FIG. 4 is an exploded view of the parts of FIG. 3.
Figure 5:
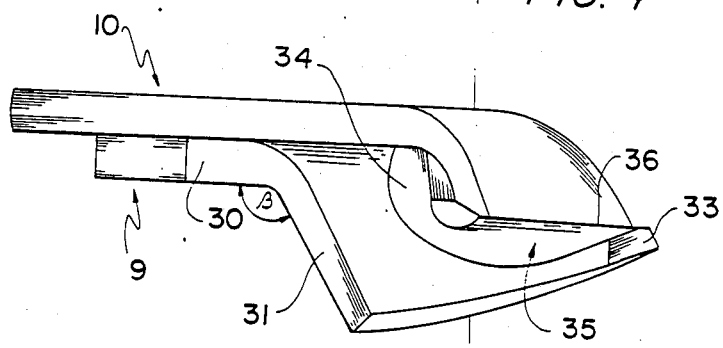
FIG. 5 is an under view of the blades of the cutter as seen when viewed in the direction of the arrow B in FIG. 1.

The movable blade 10 extends down alongside the leg portion 30 on its side opposite the foot 31, and its lower end-portion is curled to pass beneath the free end of the leg portion 30 as shown in FIGS. 3, 4, and 5. The lower end portion of the blade 10 terminates in a triangular shearing face 50 shown in FIG. 1, which lies in the same plane as the fixed shearing face extending along the straight edge 36 of the foot 31. The rear upper corner portion of the side of the blade 10 immediately above the shearing face 50 is bevelled away, as shown at 51 in FIGS. 1, 3 and 4, so that a cut marginal edge of the workpiece 46 travelling along the upper face of the foot 31 can nest in the angle B, as the tool advances along the workpiece 46, without being obstructed by the side of the movable blade 10.

A pair of washers 56,57 are mounted on the bolt 15. Preferably, the blades 9 and 10 should not be bolted together too tightly, as has been found the shearing action is improved thereby.

In order to adapt the drill to take the cutter head 5, the chuck (not shown) is first unscrewed from the threaded socket of the drill and the drive shaft 20 of the disc 18 is screwed in its place. The shroud 7 is then fitted over the collar 4 until the disc 18 fits between the bifurcations 17. The grub screw 22 can be tightened into a retaining recess (not shown) provided on the collar 4 to lock the head 5 to the drill 1.

The drill trigger 3 is depressed to power the drill causing the eccentric disc 18 to rotate and, by engaging the bifurcations, to oscillate the movableblade 10 about the pivot axis 11 to operate the cutting head.

The shearing faces are advanced towards one end of a scribe line defining the path of the intended cut on the workpiece 46. The movable blade 10 is advanced over the top of the workpiece and the fixed blade is advanced beneath the workpiece which is thus sheared between the two blades.

As the cut progresses along the workpiece, one part of the cut workpiece passes beneath the movable blade and is guided away from engagement with the fixed blade by the bevelled surfaces 33,34 and 35. The cutter can thus turn readily to follow a scribe line curving away on the side of the movable blade pivot.

On the other hand if the path of the intended cut curves in the direction of the foot 31, the cutter can still follow it as the plane of the shearing faces is displaced about 4 millimeters to one side of the plane of the leg portion 30. The bevel 51 together with the angle B ensure that the moving blade does not impede the turning of the cutter to follow the scribe line irrespective of whether the shearing is taking place at the leading or the trailing edge of the straight edge 36. In practice the angle through which the cutter can be turned is limited only by the distance between the point of shearing of the workpiece and the point, referenced 60, at which the heel of the foot 31 joins the leg portion 30.

The angle B allows the cutter to be tilted laterally when following a curve and the action of the shearing faces as the cut progresses causes them to remain in a common plane despite the limited movement the movable blade is allowed to make along the pivoted axis when the cutter is tilted laterally.

As with conventional cutters there is no impediment to it following a cutting path curving away on the side of the foot 31.

In the embodiment shown in FIGS. 6 and 7 parts corresponding to those already described with reference to earlier Figures are similarly referenced and will not be again described.

Figure 6:
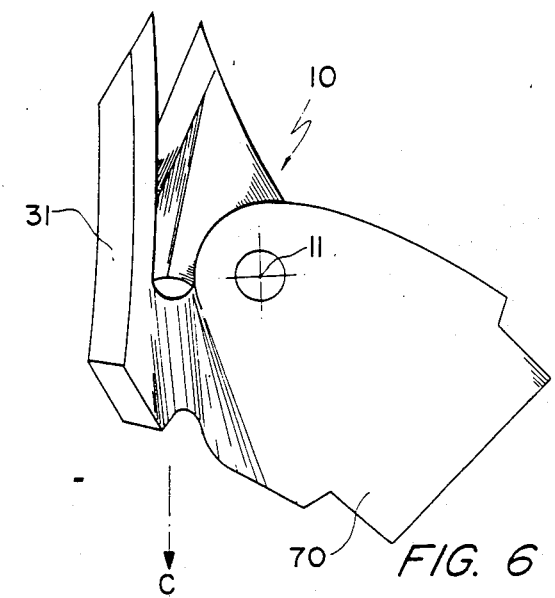
FIG. 6 shows a modification of the blades of FIG. 1, the remainder of the cutter head being omitted.
Figure 7:
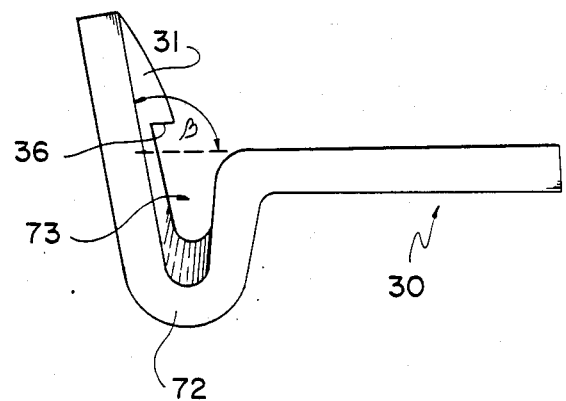
FIG. 7 shows a fixed cutter blade of FIG. 6 as seen when viewed in the direction of the arrow C in that figure.

The cutter of FIGS. 6 and 7 has a movable blade 10 and a fixed blade 70 providing a flat leg portion 30 and an offset foot 31 lying in a plane which makes the angle B with the leg portion 30 as in the earlier embodiment. However the foot 31 is connected to the leg portion 30 by a return bend 72 as is clearly shown in FIG. 7. This return bend 72 provides a deep channel 73 to accomodate the edge of the upper portion of the cut work-piece when the cutter is following a path curving away on the side of the foot 31. The point 60 of FIG. 1, which determines the maximum turning angle of the cutter when advancing to the right in FIG. 3, is moved to the other side of the leg portion 30 in the embodiment of FIG. 7, with the result that the cutter can turn through a relatively tight curve to the side of the foot 31. As the other side of the cut workpiece passes beneath the return bend 72, the return bend does not impede turning of the cutter.

In a non-illustrated variation of the embodiment shown in FIGS. 6 and 7 the plane of the foot 31 is perpendicular to the plane of the leg portion 30 and the depth of the return bend caries along its length from an initial depth of one centimetre at its forward end, to a depth of two centimetres at its trailing end, the two depths being measured from the plane of the shearing faces.

The above described cutters have the advantage that they can be used to follow scribe lines bending in both directions so that the need to change the cutting head from a right-hand cutter to a left-hand cutter is greatly reduced and in many cases avoided altogether.

The claims defining the invention are as follows:

I claim:

1. A power driven portable head for a sheet metal cutter working on the guillotine principle as set forth above, having two blades pivoted to move relative to one another one of which is fixed to the head the other being mounted to oscillate about the pivot axis during operation of the head, the fixed blade having a leg portion attached to the head and, at its free end a foot extending laterally away from the plane of the leg portion, a straight edge on the foot adjacent the leg portion being formed with a first shearing face displaced laterally away from the plane of the leg portion on its side opposite to that at which the movable blade is pivotally mounted, the movable blade having one end portion adjacent the head arranged to be oscillated about the pivot axis by a portable rotational drive applied to the head, and its other end portion shaped to pass beneath the free end of the leg portion and to terminate in a second shearing face which co-operates with the first shearing face both said first and second shearing faces lying in a plane spaced from but parallel to the plane of the leg portion.

2. A head as claimed in claim 1, in which the leg portion comprises a flat metal plate carrying the pivot intermediate its ends with its axis extending perpendicular to the plane of the plate, and the foot is also formed by a flat section of the fixed blade and extends in a plane making an angle greater than 90° with the plate plane which is parallel to a third plane containing the shearing faces.

3. A head as claimed in claim 2, in which the angle between the planes of the foot and the flat plate of the leg portion is approximately 115°.

4. A head as claimed in claim 1, in which under corner edges of the foot are bevelled away beneath the first shearing face and at the forward-facing portions at the ends of the foot.

5. A head as claimed in claim 1, in which the moving blade has its upper corner portion above the second shearing face bevelled away so as not to bear against a cut edge of the workpiece when the cutter is turning in the general direction of the foot.

6. a head as claimed in claim 1, in which the pivot is adjustably secured to the fixed blade and the movable blade can displace a limited extent along the axis of the pivot.

7. A head as claimed in claim 6, in which the pivot is provided by a bolt on which the movable blade is slidable and which is screwed into a threaded aperture in the fixed blade permitting adjustment of the length of the bolt along which the movable blade is slidable.

8. A head as claimed in claim 1, in which the foot is attached to the free end of the leg portion by a return bend extending beneath the leg portion and the pivot and providing a channel for accommodating a marginal edge portion of a cut workpiece when the cutter is turning in the general direction of the foot.

9. A head as claimed in claim 1, formed with a cylindrical shroud having the fixed blade extending from one end rim, and provided with a pair of diametrically opposed slots wider than the movable blade which is mounted to oscillate in the plane of the slots and is formed with a bifurcated end to receive between them a disc which is eccentrically mounted on a threaded drive shaft adapted to be screwed into a threaded chuch-socket of an electric portable drill.

* * * * *